US 12,257,899 B2

(12) United States Patent
Kirchmair et al.

(10) Patent No.: US 12,257,899 B2
(45) Date of Patent: Mar. 25, 2025

(54) SNOW GROOMER WITH TOUCH SCREEN CONTROL USER INTERFACE

(71) Applicant: Prinoth S.p,A., Vipiteno (IT)

(72) Inventors: Martin Kirchmair, Vipitino (IT); Stephan Muehlsteiger, Vipiteno (IT)

(73) Assignee: Prinoth, S.p.A. (IT)

( * ) Notice: Subject to any disclaimer, the term of this patent is extended or adjusted under 35 U.S.C. 154(b) by 226 days.

(21) Appl. No.: 17/789,853

(22) PCT Filed: Dec. 30, 2020

(86) PCT No.: PCT/IB2020/062550
§ 371 (c)(1),
(2) Date: Jun. 29, 2022

(87) PCT Pub. No.: WO2021/137175
PCT Pub. Date: Jul. 8, 2021

(65) Prior Publication Data
US 2023/0036971 A1 Feb. 2, 2023

(30) Foreign Application Priority Data
Dec. 30, 2019 (IT) .......................... 102019000025747

(51) Int. Cl.
*B60K 35/00* (2024.01)
*B60K 35/10* (2024.01)
(Continued)

(52) U.S. Cl.
CPC ............ *B60K 35/00* (2013.01); *B62D 55/065* (2013.01); *B62D 55/286* (2013.01); *E01H 4/02* (2013.01);
(Continued)

(58) Field of Classification Search
CPC .. E01H 4/02; G06T 7/20; B60K 35/00; G06F 3/04817; G06F 3/0485; G06F 3/04886;
(Continued)

(56) References Cited

U.S. PATENT DOCUMENTS 8,413,271 B2 * 4/2013 Blanchard .............. A61G 7/001
5/173
10,061,508 B2 * 8/2018 Wild ................... G06F 3/04886
(Continued)

FOREIGN PATENT DOCUMENTS

DE 2514874 A1 * 10/2012 ............. E01C 19/00

OTHER PUBLICATIONS

PCT/IB2020/062550—ISR & Written Opinion mailed Mar. 22, 2021.

*Primary Examiner* — Yuri Kan
(74) *Attorney, Agent, or Firm* — Aldo Noto, Esq.; Rimon PC

(57) ABSTRACT

A snow groomer with touch screen controls for tensioning tracks, suspension, drive unit, accessories and other, comprising:
  a plurality of tracks;
  at least one accessory device selected in a group comprising a shovel or blade, a tiller assembly and a winch assembly; and
  a user interface comprising a display and a selector device for receiving commands from an operator, preferably the selector device is a device that detects a touch of an operator on the display;
  a control unit coupled to the user interface, in particular to the display, for sending images to be displayed to the display and receiving commands from the display which are related to the touches detected;
  wherein the control unit is configured to display on the display a main screen divided into a plurality of main
(Continued)

screen portions, wherein the plurality of main screen portions are displayed together in the main screen and each in a different position in the main screen; wherein each main screen portion is configured to display an image that illustrates one or more pieces of data and/or information correlated to the tracked vehicle;

the control unit is configured to detect one or more selections made by an operator, preferably on the display by means of a touch, corresponding to the type(s) of data or information that are required to be displayed in each portion of the display, and to display a main screen portion in each portion of the display, wherein each main screen portion is configured to illustrate a respective image relating to the data or information selected by the operator for said portion of the display.

20 Claims, 7 Drawing Sheets

(51) Int. Cl.
  *B60K 35/28* (2024.01)
  *B60K 35/29* (2024.01)
  *B60K 35/65* (2024.01)
  *B60K 35/81* (2024.01)
  *B62D 55/065* (2006.01)
  *B62D 55/28* (2006.01)
  *E01H 4/02* (2006.01)

(52) U.S. Cl.
  CPC .............. *B60K 35/10* (2024.01); *B60K 35/28* (2024.01); *B60K 35/29* (2024.01); *B60K 35/65* (2024.01); *B60K 35/81* (2024.01); *B60K 2360/11* (2024.01); *B60K 2360/1438* (2024.01); *B60K 2360/164* (2024.01); *B60K 2360/166* (2024.01); *B60K 2360/167* (2024.01); *B60K 2360/171* (2024.01); *B60K 2360/176* (2024.01); *B60K 2360/191* (2024.01); *B60K 2360/731* (2024.01)

(58) Field of Classification Search
  CPC .. B64C 39/024; B60G 17/0523; B62D 55/30; E01C 19/00; G05B 23/0267; A61G 7/001
  See application file for complete search history.

(56) References Cited

U.S. PATENT DOCUMENTS

| | | | |
|---|---|---|---|
| 2002/0156574 A1* | 10/2002 | Fortin .................... | B62D 55/30 701/469 |
| 2014/0046458 A1* | 2/2014 | Timsjo ............... | G05B 23/0267 700/28 |
| 2014/0218307 A1* | 8/2014 | Goldman-Shenhar ...................... | G06F 3/0485 345/173 |
| 2014/0298228 A1 | 10/2014 | Meegan et al. | |
| 2014/0375002 A1* | 12/2014 | Coombs ............. | B60G 17/0523 280/6.157 |
| 2018/0208060 A1* | 7/2018 | Kim ....................... | B60K 35/00 |
| 2019/0127985 A1* | 5/2019 | Dundorf ............... | B64C 39/024 |
| 2019/0152321 A1 | 5/2019 | Losch et al. | |
| 2020/0233567 A1* | 7/2020 | Boyagian ............ | G06F 3/04817 |
| 2020/0369148 A1* | 11/2020 | Bongard ................ | B60K 35/00 |
| 2022/0035320 A1* | 2/2022 | Tschinkel .................. | G06T 7/20 |

\* cited by examiner

# SNOW GROOMER WITH TOUCH SCREEN CONTROL USER INTERFACE

CROSS-REFERENCE TO RELATED APPLICATIONS

This patent application claims priority from Italian Patent Application No. 102019000025747 filed on Dec. 30, 2019, the entire disclosure of which is incorporated herein by reference.

TECHNICAL FIELD

The present invention relates to a tracked vehicle comprising a user interface, in particular a snow groomer vehicle comprising a user interface.

BACKGROUND ART

A tracked vehicle generally comprises one or more accessories including a shovel, a tiller and a winch; and a user interface comprising a joystick coupled to the one or more accessories to control the movements of the one or more accessories, and a display on which various parameters relating to the tracked vehicle and to the one or more accessories are shown. Depending on the type of tracked vehicle, it may comprise two levers or a steering wheel and pedals to control the tracks.

Each display of a tracked vehicle is different from the display of other tracked vehicles and the information is placed in different places. Accordingly, for an operator using different tracked vehicles it is difficult each time to keep all the information he/she needs under control immediately, and each time, he/she has to get used to different displays. Many times, there are personal preferences of operators who prefer some displays of some tracked vehicles and other personal preferences of other operators who prefer other displays of other tracked vehicles, this obviously prompts each operator to prefer the use of one tracked vehicle over another based on personal preferences, because due to personal affinity he/she considers one tracked vehicle easier to use than another.

DISCLOSURE OF INVENTION

One object of the present invention is to provide a tracked vehicle which allows at least one of the drawbacks of the prior art to be mitigated.

According to the present invention, therefore, a tracked vehicle is provided, preferably a snow groomer for the preparation of ski runs, comprising:

a plurality of tracks;

at least one accessory device selected from a group comprising a shovel or blade, a tiller assembly and a winch assembly; and a user interface comprising a display and a selector device for receiving commands from an operator, preferably the selector device is a device that detects a touch of an operator on the display;

a control unit coupled to the user interface, in particular to the display, for sending images to be displayed to the display and receiving commands from the display which are related to the touches detected;

wherein the control unit is configured to display on the display a main screen divided into a plurality of main screen portions, wherein the plurality of main screen portions are displayed together in the main screen and each in a different position in the main screen; wherein each main screen portion is configured to display an image that illustrates one or more pieces of data and/or information correlated to the tracked vehicle;

the control unit is configured to detect one or more selections made by an operator, preferably on the display by means of a touch, corresponding to the type(s) of data or information that are required to be displayed in each portion of the display, and to display a main screen portion in each portion of the display, wherein each main screen portion is configured to illustrate a respective image relating to the data or information selected by the operator for said portion of the display.

Alternatively, the selection made by the operator can be preset and/or selectable from a plurality of standard settings.

Thanks to the present invention, the operator has a greater amount of information displayed all together on a single display and above all can select which information to display in each portion of the display.

Another object of the present invention is to provide a method for displaying information and/or setting commands in a tracked vehicle, in particular a snow groomer vehicle, by means of a display in the tracked vehicle.

According to the present invention, a method is provided for displaying information and/or setting commands in a tracked vehicle, preferably a snow groomer, by means of a display in the tracked vehicle; the tracked vehicle, preferably a snow groomer for the preparation of ski runs, comprising a plurality of tracks; at least one accessory device selected from a group comprising a shovel or blade, a tiller assembly and a winch assembly, and the display;

the method comprising the steps of:

displaying on the display a main screen divided into a plurality of main screen portions, wherein the plurality of main screen portions are displayed together in the main screen and each in a different position in the main screen; wherein each main screen portion is configured to display an image that illustrates one or more pieces of data and/or information correlated to the tracked vehicle;

detecting one or more selections made by an operator, preferably on the display by means of a touch, corresponding to the type(s) of data or information that are required to be displayed in each portion of the display, displaying a main screen portion in each portion of the display, wherein each main screen portion is configured to illustrate a respective image relating to the data or information selected by the operator for said portion of the display.

Alternatively, the selection made by the operator can be preset and/or selectable from a plurality of standard settings.

BRIEF DESCRIPTION OF THE DRAWINGS

Further features and advantages of the present invention will be apparent from the following description of non-limiting embodiments thereof, with reference to the figures of the accompanying drawings, wherein.

BEST MODE FOR CARRYING OUT THE INVENTION

Figure 1:
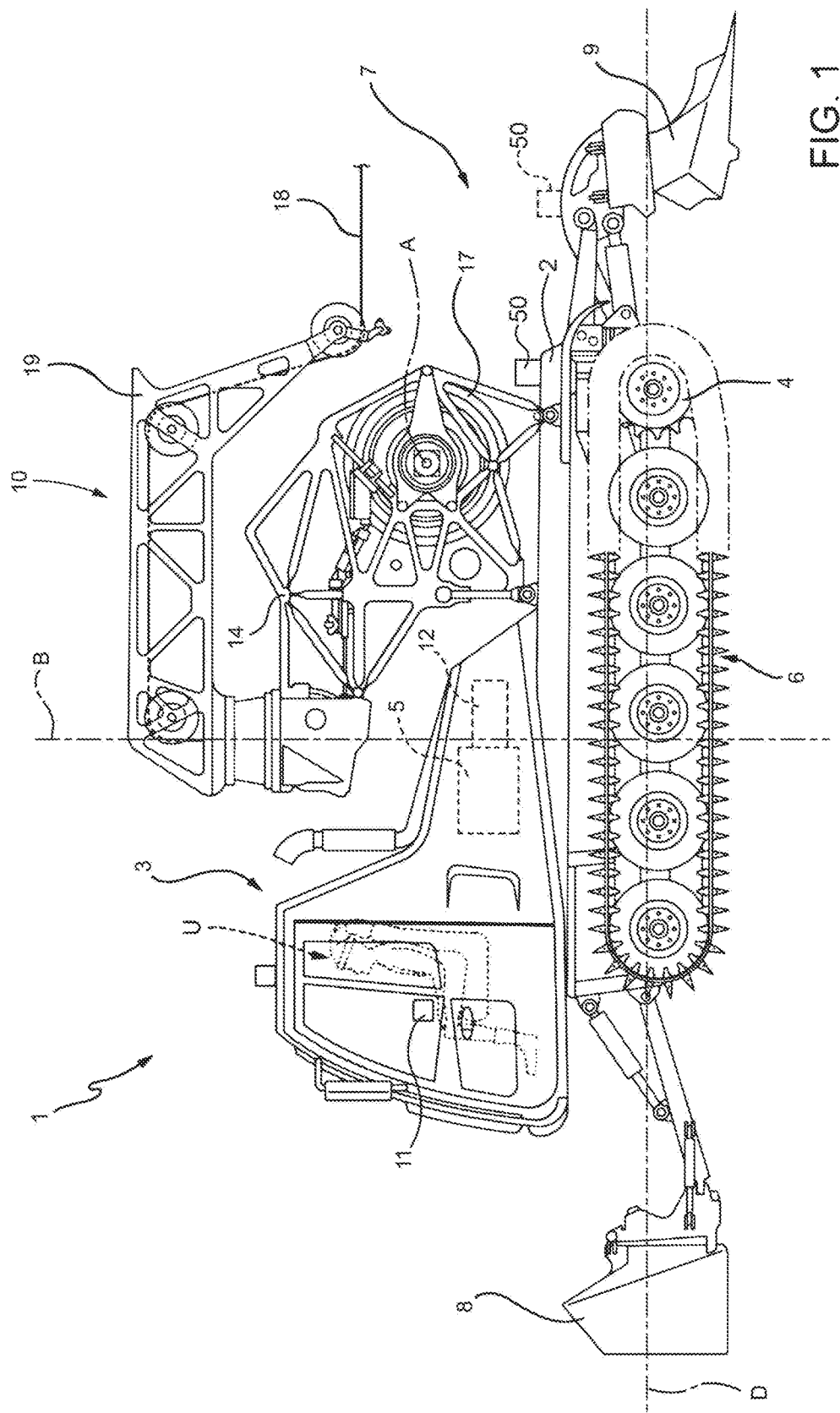
FIG. 1 is a side view of a tracked vehicle made in accordance with the present invention.

With reference to FIG. 1, a tracked vehicle, in particular a snow groomer vehicle for the preparation of ski runs, according to one embodiment of the present invention is indicated as a whole with the number 1.

The tracked vehicle 1 comprises a frame 2, which extends along a longitudinal axis D, a driver's cab 3, and a drive unit 5, for example an internal combustion engine or an electric motor. The driver's cab 3 and the drive unit 5 are housed on the frame 2. The tracked vehicle 1 is also provided with a pair of tracks 6 and with accessory devices 7. The accessory devices 7 comprise a blade or shovel 8, supported by the frame 2 at the front; and a tiller assembly 9, supported by the frame 2 at the rear. The tiller assembly 9 comprises a tiller and a finisher. Furthermore, the tiller assembly 9 can comprise auxiliary tillers (not shown in the figure) and track-setting assemblies (not shown in the figure) for setting tracks for cross-country ski runs.

Furthermore, the accessory devices 7 comprise a winch assembly 10. A power transmission 12 (FIG. 3) is operatively coupled to the drive unit 5, which provides the power necessary for the operation of the tracked vehicle 1, and to the accessory devices 7. The power transmission 12 can be hydraulic or electric or a combination of both.

The accessory devices 7 can also be called accessories.

Furthermore, a tracked vehicle 1 does not necessarily comprise all the accessory devices 7 illustrated above. For example, a tracked vehicle 1 can comprise any one or two of the accessory devices 7 selected from the blade 8, the tiller assembly 9 and the winch assembly 10.

A user interface 11 is installed in the driver's cab 3, which interface 11 allows an operator to control the movement of the tracked vehicle 1 and the operation of the accessory devices 7.

In particular, the user interface 11 comprises a control device 4, a joystick 13 and a display 30.

The control device 4 is configured to control the tracks 6. In greater detail, the control device 4 is coupled to the plurality of tracks 6 to control the movement of the tracked vehicle 1.

The joystick 13 is coupled to the accessory devices 7 to control the movements of the accessory devices 7.

The tracked vehicle 1 is provided with a control system 15.

The control system 15 detects operating parameters of the tracked vehicle 1, such as, for example, but not limited to, the power delivered by the drive unit 5, the power absorbed by each of the accessory devices 7, the position of the blade 8 and of the tiller assembly 9, the position of the winch assembly 10, the drive speed of the tracked vehicle 1, and controls the drive unit 5, the tracks 6 and the accessory devices 7 based on the commands it receives from the user interface 11.

The blade 8 can be raised or lowered. Moreover, the blade 8 can be rotated preferably by lateral inclination or by a roll motion, in practice creating a difference in height between the right and left ends of the blade 8 with respect to the plane of the tracks 6.

Furthermore, the blade 8 can be tilted downwards to create a pitch motion in order to define an angle of incidence of the blade 8, also called the cutting angle.

Furthermore, the blade 8 can be positioned perpendicularly or obliquely with respect to the direction of movement of the tracked vehicle 1, i.e., inclined or moved to define a yaw rotation.

The joystick 13 of the user interface 11 is configured to control the blade 8. The joystick 13 is housed in the cab 3 and allows the above-described pitch, roll and yaw movements of the blade 8 to be controlled.

The tiller assembly 9 is connected to the frame 2 of the tracked vehicle 1 so that it can be rotated, in practice by arranging the blade 8 perpendicular or oblique with respect to the direction of movement of the tracked vehicle 1, raised or lowered, and translated sideways. Furthermore, a relative angular position of the tiller assembly 9 can be determined with respect to the frame 2 in order to define a cutting angle of the tiller assembly 9.

The joystick 13 of the user interface 11 is configured to control the tiller assembly 9 and allows the above-described movements of the tiller assembly 9 to be controlled.

With reference to FIG. 1, the winch assembly 10 comprises a drum 17, around which a rope 18 is wound, and an arm 19. The drum 17 rotates around an axis A and is driven by a motor and defines the pulling force of the rope 18. The arm 19 rotates around an axis B and is driven by an actuator to define the position of the arm 19 so as to orient the rope 18.

The joystick 13 of the user interface 11 is configured to control the winch assembly 10, in particular the pulling force of the rope 18 and the angular position of the arm 19.

Figure 2:
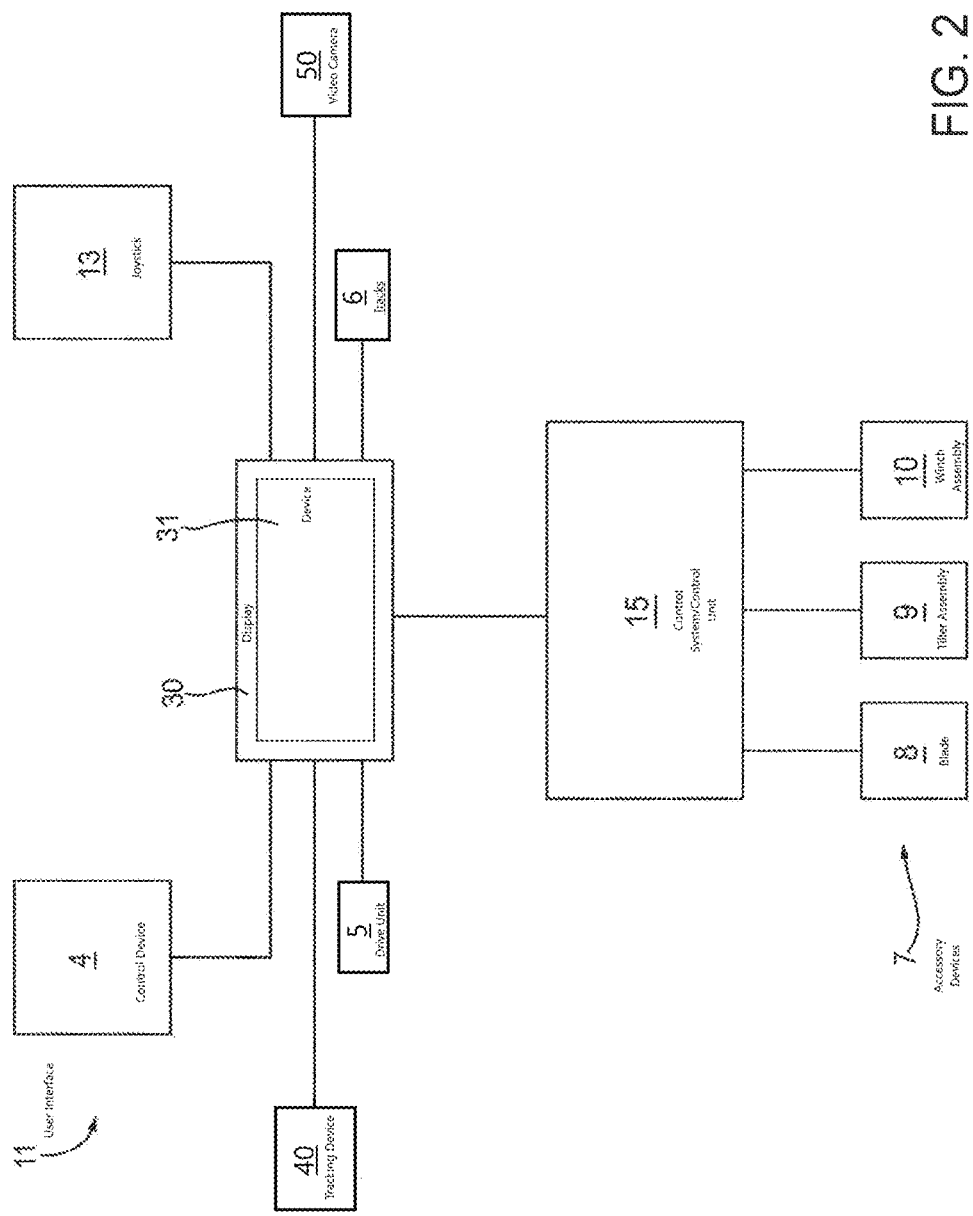
FIG. 2 is a block diagram of a detail of the tracked vehicle 1.

With reference to FIG. 2, the user interface 11 comprises the display 30 and a device 31 for detecting at least one touch on the display 30, to detect at least one touch of an operator U on the display 30 so as to detect selections made by an operator U by means of at least one touch on the display 30.

In particular, the display 30, thanks to the detection device 31, is of the touch screen or touch-sensitive type and the control unit 15 is configured to receive selections by means of touches on the display 30.

The control system 15 is coupled to the user interface 11, in particular to the display 30, and is configured for sending images to be displayed to the display 30 and receiving commands from the display 30 which are related to the touches detected, in order to detect selections made by the operator U of the tracked vehicle, typically a driver of the tracked vehicle.

Figure 3:
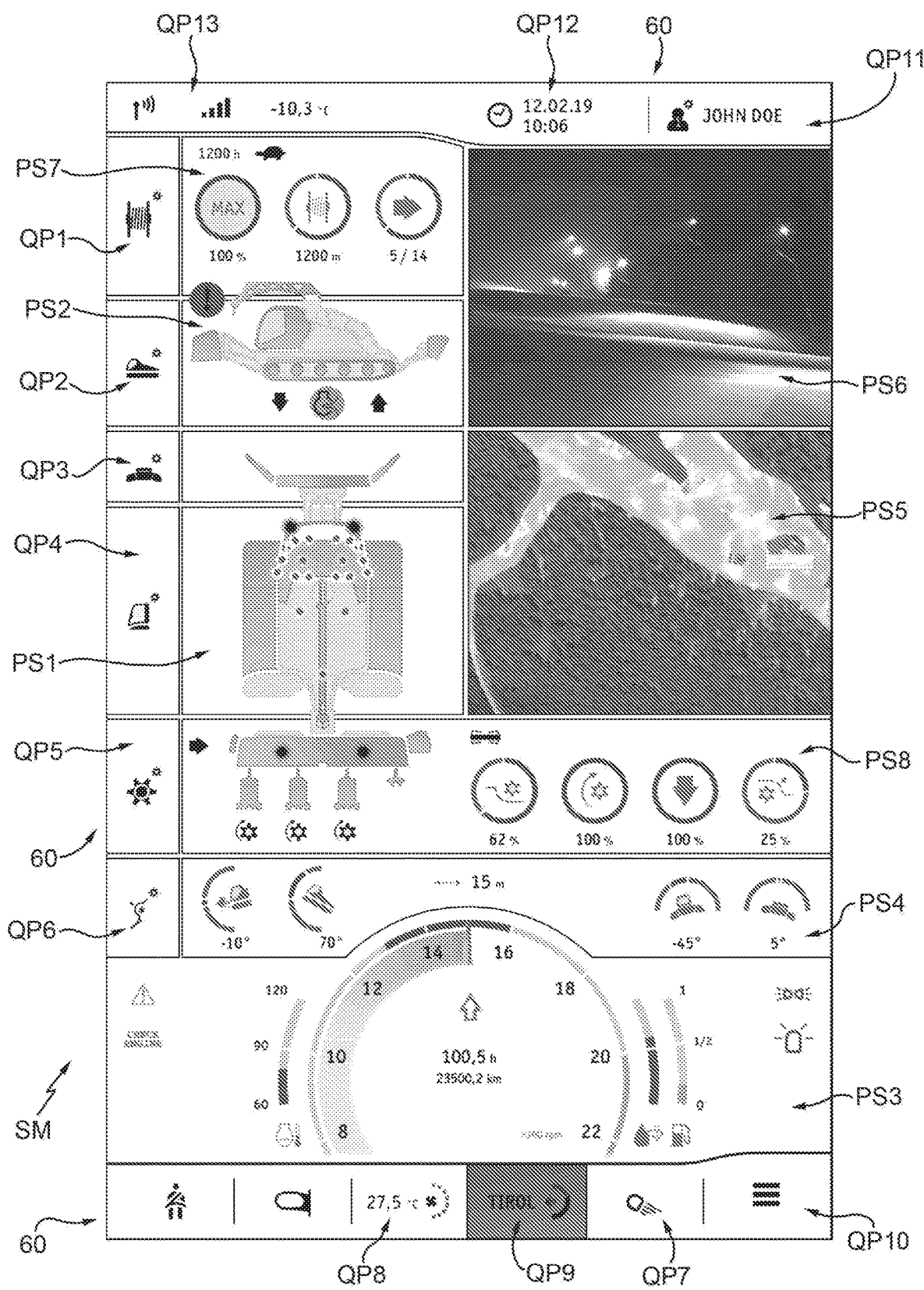
FIG. 3 is a view of the screen of a display of the tracked vehicle in FIG. 1 in one display mode.

With reference to FIG. 3, the control unit 11 is configured to display on the display 30 a main screen SM divided into a plurality of main screen portions PS1-PS8; wherein each main screen portion PS1-PS8 is configured to display an image that illustrates one or more pieces of data and/or information correlated to the tracked vehicle 1. Furthermore, commands can be set for the tracked vehicle 1 through at least some of the plurality of main screen portions PS1-PS8.

The control unit 11 is configured to detect, in particular by means of the detection device 31, one or more touches on the display 30 relating to one or more selections made by an operator U on the display 30, corresponding to the type(s) of data or information that are required to be displayed in each portion of the display 30, and to display a related main screen portion PS1-PS8 in each related portion of the display 30, wherein the main screen portion PS1-PS8 is configured to illustrate a respective image relating to the data or information selected by the operator U.

In particular, in a preferred embodiment, the control unit 11 is configured to display in a first main screen portion PS1 of the plurality of main screen portions a first, preferably schematic depiction of the tracked vehicle 1.

In addition, the control unit 11 is configured to display in a second main screen portion PS2 of the plurality of main screen portions a second depiction of the tracked vehicle 1. In particular, the first depiction is a top view of the tracked vehicle 1 and the second depiction is a side view of the tracked vehicle 1, and preferably the first and second depictions are schematic.

In particular, each depiction of the tracked vehicle 1 shows, through said depiction, the accessories 7 the tracked vehicle 1 has at that moment. For example, in the first and/or second depiction, when the tracked vehicle 1 is equipped with one of the accessories 7 comprising the shovel 8, the shovel is also schematically represented in the first and/or second depiction.

Furthermore, the control unit 11 is configured to display in a third main screen portion PS3 of the plurality of main screen portions the data relating to the drive speed of the tracked vehicle and/or the data relating to the engine revolutions of the tracked vehicle and/or the data relating to a control light of the drive unit 5 and/or to the total working hours in the service life of the tracked vehicle and/or to the total distance travelled in the service life of the tracked vehicle and/or to the temperature of the fluid that is functional to the operation of the tracked vehicle, e.g., a temperature of a liquid in the drive unit 5, and/or to the residual power level(s) of the drive unit 5 in an energy harvesting system, e.g. the residual fuel level in a tank when the drive unit 5 is an internal combustion engine, or the residual electrical energy level in a battery when the drive unit 5 is an electric motor, or the fuel and electrical energy levels when the drive unit 5 is hybrid and comprises a combustion engine as well as an electric motor.

Furthermore, the control unit 11 is configured to display in a fourth main screen portion PS4 of the plurality of main screen portions the data relating to the tilt of the tracked vehicle 1 according to a longitudinal axis, in particular to display the angle of roll of the tracked vehicle 1 around a roll axis; and/or the data relating to the tilt of the tracked vehicle 1 according to a transverse axis, in particular to display the pitch angle around a pitch axis.

Furthermore, the tracked vehicle 1 comprises a tracking device 40, in particular a GPS receiver or the like, configured to establish the position of the tracked vehicle 1 and preferably comprising a memory with a plurality of maps, in particular maps of ski resorts for tracking the position of the tracked vehicle 1 in one of the ski resorts.

Moreover, the control unit 15 is configured to display in a fifth main screen portion PS5 of the plurality of main screen portions a navigation map of the tracked vehicle 1, preferably the control unit 15 is configured to display on the navigation map of the tracked vehicle 1 the path already travelled by the tracked vehicle 1. In addition, in a preferred embodiment, the control unit 15 is configured to connect to a remote fleet management system and display on the map other tracked vehicles 1 present in the ski resort, and preferably display the path already travelled by the other tracked vehicles within the ski resort.

Furthermore, the tracked vehicle 1 comprises at least one video camera 50 fixed at the rear of the tracked vehicle 1, preferably the position where the video camera 50 is fixed is at a point along a line parallel to the axis D and, with respect to the direction of travel, in the same position as or behind the drive wheels of the tracked vehicle 1 and/or the position of the winch 10. In an alternative embodiment, the video camera 50 is fixed above the tiller 9. In all the embodiments, the video camera 50 faces the rear of the tracked vehicle 1, in particular it is configured to frame a snow cover beyond the tiller 9 and/or the tracks 6.

Furthermore, the control unit 11 is configured to display in a sixth main screen portion of the plurality of main screen portions the images captured by the video camera 50 preferably framing the rear portion of the tracked vehicle 1, in particular a portion of snow already worked.

Figure 4:
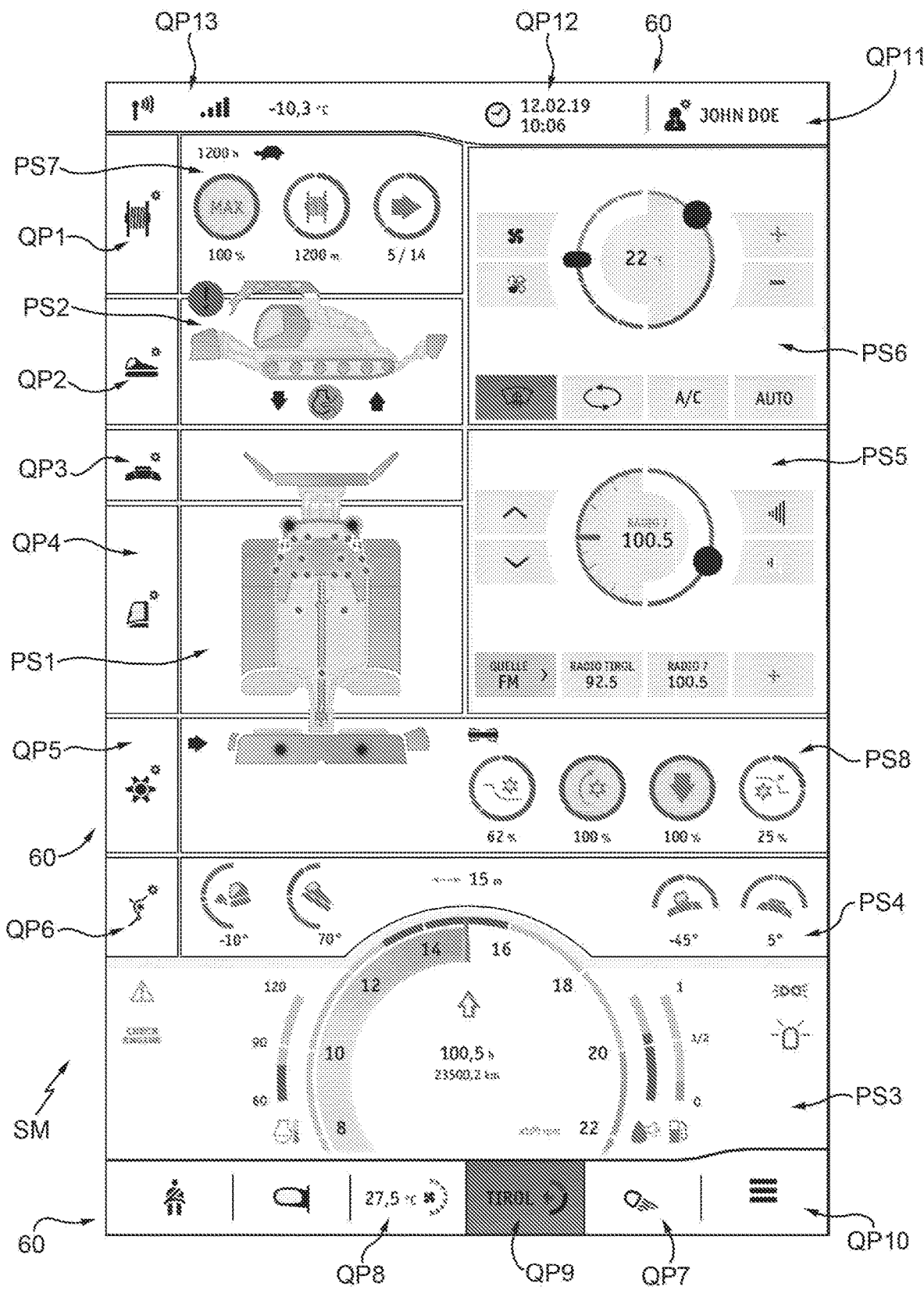
FIG. 4 is a view of another screen of the display of the tracked vehicle in FIG. 1 in another display mode.

With reference to FIG. 4, the control unit 15 is configured to display in the fifth portion PS5 or in the sixth portion PS6 of the main screen a thermostat for setting the temperature inside the cab of the tracked vehicle 1, instead of the map or the video camera image 50, respectively.

In addition, the control unit 15 is configured to display in the fifth portion PS5 or in the sixth portion PS6 of the main screen a frequency tuning for the stations of a car radio, instead of the map or the video camera image 50, respectively.

In particular, the control unit 15 is configured to detect, by means of touches of the operator U on the display 30, the selection of what to display in the main screen portions, in particular in the fifth PS5 and/or in the sixth PS6 screen portion the control unit 15 is configured to detect from the operator U whether to display the thermostat or the map or the frequency tuning or the video camera image.

Furthermore, with reference to FIGS. 3, 4, 5 and 6, in a preferred embodiment, the accessory 7 comprises at least the winch 10, in this embodiment the control unit 15 is configured to display in a seventh portion PS7 of the main screen values relating to the winch, preferably one or more of the following values: length of cable unwound, pulling force in absolute value or as a percentage of the total possible pulling force.

Furthermore, with reference to FIGS. 3, 4, 5 and 6, in a preferred embodiment, the accessory 7 comprises at least the tiller 9, the control unit 15 is configured to display in an eighth portion PS8 of the main screen a representation of a tiller 9, and preferably of any track-setting devices connected thereto, and preferably to illustrate next to the representation of the tiller 9 values relating to the tiller 9, preferably one or more of the following values: shaft rotation speed, shaft rotation direction, tilt angle of the tiller 9 with respect to the snow cover, percentage of snow recirculation inside a working chamber of the tiller 9.

Figure 5:
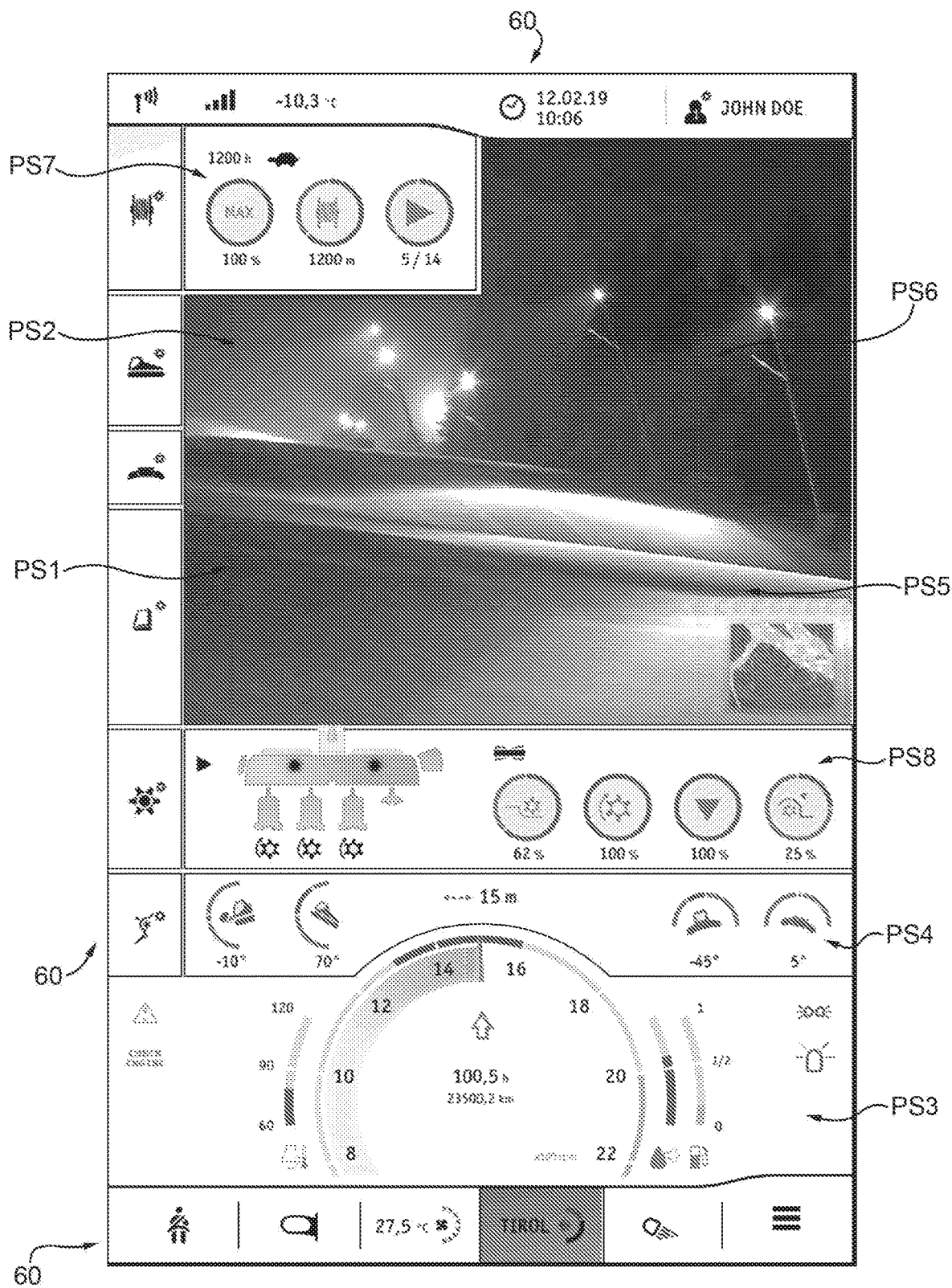
FIG. 5 is a view of another screen of the display of the tracked vehicle in FIG. 1 in another display mode.

Furthermore, with reference to FIG. 5, the control unit 15 is configured to work in a further display mode in which it is configured to display on the display 30 the image captured by the video camera 50 in the first PS1, the second PS2, the fifth PS5 and the sixth portion PS6 of the main screen SM, in particular different portions of the whole image are illustrated in a respective portion so that the whole image is illustrated among the various portions indicated above. Preferably, the image relates to the frame captured by the video camera 50 facing the rear of the tracked vehicle 1, in particular it frames a portion of snow already worked. Furthermore, preferably the control unit 15 is configured to display in the first PS1, the second PS2, the fifth PS5 and the sixth portion PS6 of the main screen SM the image captured by the video camera 50 and, superimposed on a portion thereof, a miniature portion of the navigation map of the tracked vehicle 1, preferably the navigation map of the tracked vehicle 1 highlights the path already travelled by the tracked vehicle 1.

Moreover, in this display mode, the control unit 15, depending on the selection made by the operator U, is configured to display in the seventh portion PS7 of the main screen SM the data from the winch 10 as illustrated for FIGS. 3 and 4, or a portion of the image captured by the video camera 50 and, in transparency, the data from the winch 10 superimposed on said image.

Figure 6:
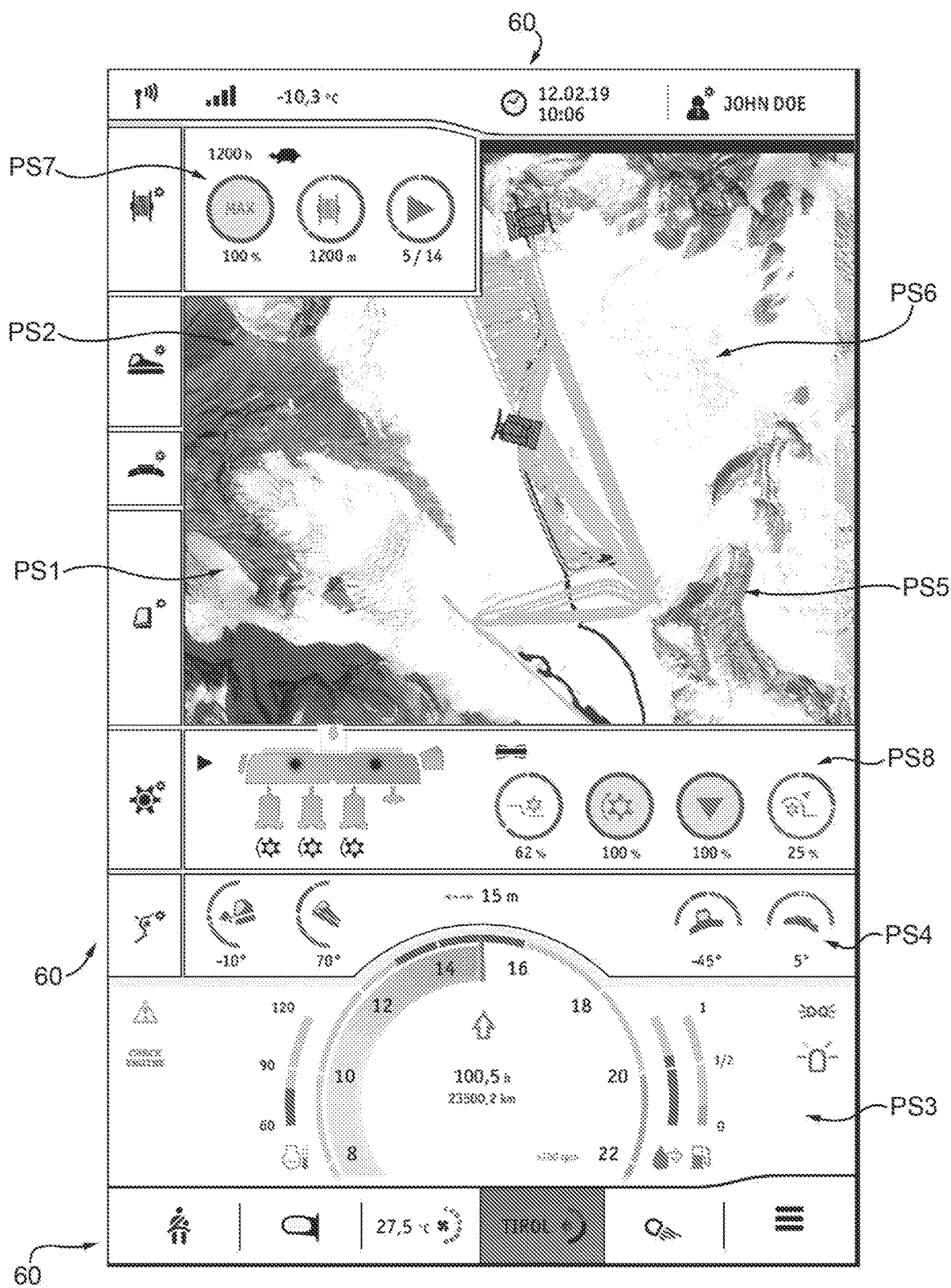
FIG. 6 is a view of another screen of the display of the tracked vehicle in FIG. 1 in another display mode.

With reference to FIG. 6, the control unit 15 is configured to work in a further display mode in which it is configured to display on the display 30 the navigation map of the tracked vehicle 1 in the first PS1, the second PS2, the fifth PS5 and the sixth portion PS6 of the main screen SM, preferably the navigation map of the tracked vehicle 1 highlights the path already travelled by the tracked vehicle 1 and preferably, in a small miniaturised portion, the image captured by a video camera 50 preferably framing the rear portion of the tracked vehicle 1, in particular a portion of snow already worked.

Moreover, in this display mode, the control unit 15, depending on the selection made by the operator U, is configured to display in the seventh portion PS7 of the main screen the data from the winch as illustrated for FIGS. 3 and 4, or a portion of the map and, in transparency, the data from the winch 10 superimposed on said portion of the map.

Furthermore, the control unit 15 is configured to store the different configurations of the display 30, in particular the different configurations of the main screens SM, selected by different operators U and associate therewith a respective operator code, and is configured to call up and display on the display 30 one of the stored configurations when the operator code associated with one of the stored configurations is entered.

In particular, the control unit 15 is configured to receive signals from the accessories 7 connected to the tracked vehicle 1 and is configured to display in the representation of the tracked vehicle only the accessories 7 which are currently connected to the tracked vehicle 1, preferably one or more of the shovel, the tiller, the track setting devices and the winch. Accordingly, in the event that the tracked vehicle 1 does not have the winch 10 as an accessory 7, the control unit 15 will not illustrate the data from the winch 10 in the seventh portion PS7 of the main screen, and this portion of the screen will illustrate no information or information selected by an operator U, or the control unit 15 will display the information that was illustrated in the second portion PS2 of the main screen SM in FIG. 3 or 4, in the second portion PS2 of the main screen and in the seventh portion PS7 of the main screen. Similarly, in the event that the accessories 7 do not include a tiller 9, the control unit 15 is configured to display no information in the eighth portion PS8 of the main screen or it will illustrate other information selected by the user U.

With reference to FIGS. 3 and 4, the control unit 15 is configured to display in the representation of the tracked vehicle 1, the representation of the tensioning of the tracks 6 of the tracked vehicle 1, in particular by means of arrows positioned under the representation of the tracks 6 of the tracked vehicle 1 and indicating the directions associated with a tensioning of the tracks 6. With reference to FIGS. 3 and 4, said representation of the accessories 7 comprises the depiction of the current position of the accessories 7, in particular the raised or lowered position of the tiller 9 and/or the position, for example front or rear, of the arm 19 of the winch 10.

Furthermore, the shovel 8 of the tracked vehicle 1 comprises a central blade and two side blades coupled to the central blade and configured to vary their position with respect to the central blade, the control unit 15 is configured to receive signals from the shovel 8 and display in the representation of the tracked vehicle 1 the shovel assembly 8 with the central blade and the side blades and the current position of the side blades.

Furthermore, the tiller 9 of the tracked vehicle 1 comprises two side wings (flaps) configured to vary their position with respect to a central body of the tiller 9, in particular to the rotating shaft of the tiller 9. The control unit 15 is configured to display in the representation of the tracked vehicle 1 the current position of the side wings of the tiller 9.

Moreover, the control unit 15 is configured to work in an alternative display mode wherein the display of one or more of any of the images described above can be extended to two or more main screen portions, and one or more of any of the other images described above can be displayed in transparency over the one or more of any of the images that are extended to two or more screen portions.

Figure 7:
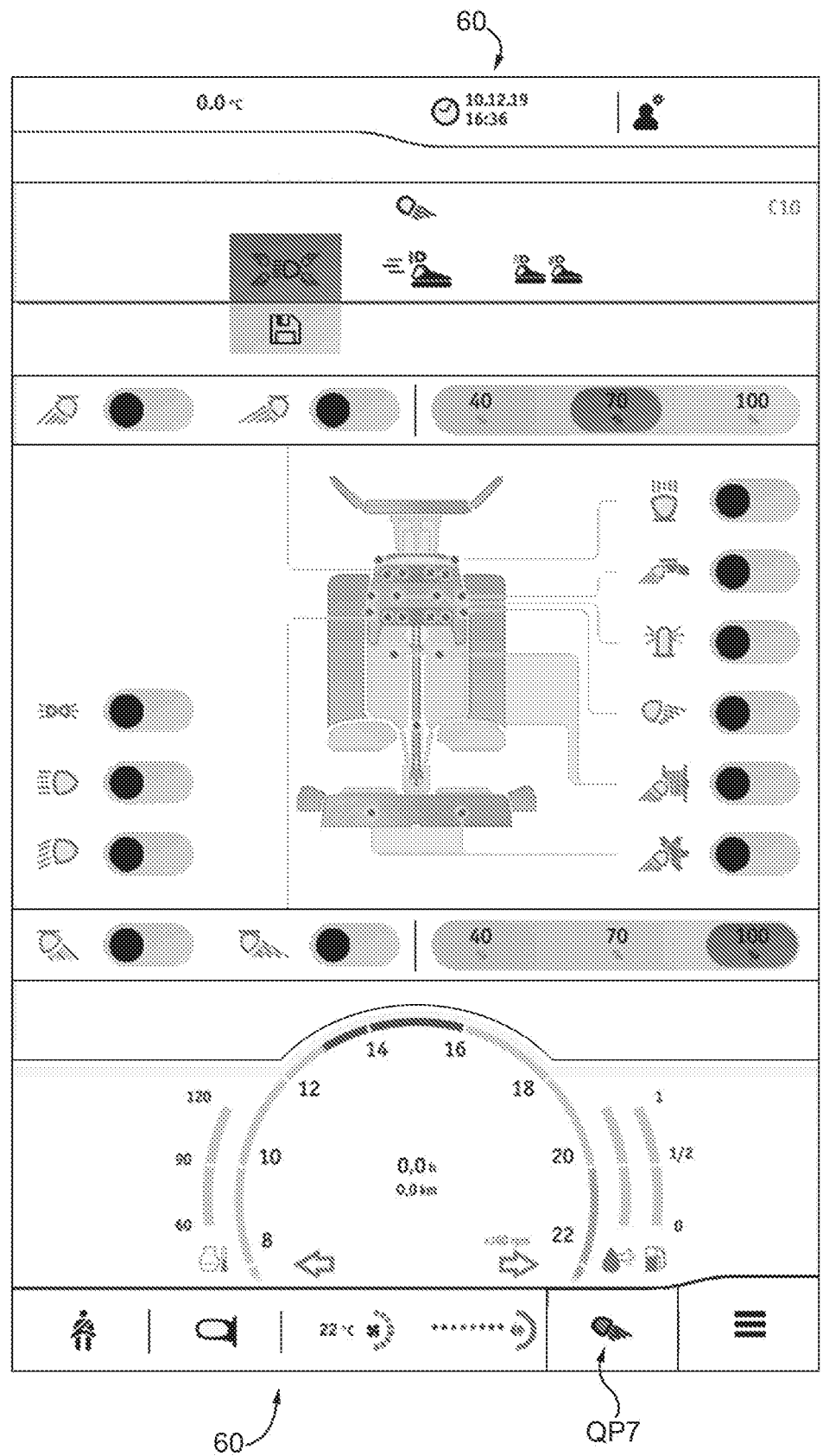
FIG. 7 is a view of another screen of the display of the tracked vehicle in FIG. 1 in another display mode.

Furthermore, the control unit 15 is configured to work in a further alternative display mode in which it is configured to display on the display 30 a secondary screen alternative to the main screen and depicting the internal operating parameters of the tracked vehicle 1. In particular, the internal operating parameters are configuration parameters for any device of the tracked vehicle 1, for example the switching on of one of the plurality of lighting devices arranged along the tracked vehicle 1 to illuminate the surrounding work environment or, for example, internal configuration parameters for the drive unit 5 and/or the tiller 9 and/or the winch 10 and/or the tracks 6 and/or a hydraulic system of the tracked vehicle 1, for example, the hydraulic system for feeding the tracks 6 and/or the winch 10 and/or the shovel 8 and/or the tiller 9. An example of such a secondary screen is shown in FIG. 7 in which, after a selection made by the operator U, the main screen is temporarily replaced by the secondary screen which illustrates the profile of the plurality of devices for lighting the surrounding environment and also allows the setting of configuration profiles for the plurality of lighting devices.

In a preferred version, the control unit 15 is configured to display the main screen SM while the tracked vehicle 1 is moving, and the secondary screen following a selection made by the operator U and preferably when the tracked vehicle 1 is stationary. In addition, some secondary screens and consequently some parameters of the tracked vehicle 1 can only be displayed by authorized operators, such as maintenance technicians, and accessed via a maintenance code.

With reference to FIGS. 3 to 6, the main screen SM displayed on the display 30 by the control unit 15 comprises a further plurality of screen portions QP1-QP13, preferably arranged along at least one of the outer edges 60 of the main screen SM, preferably along three outer edges 60 of the main screen SM.

The control unit 15 is configured to couple each of the further plurality of screen portions QP1-QP13 to a respective plurality of secondary screens. The plurality of secondary screens illustrates further pluralities of parameters of the tracked vehicle 1, wherein at least one of the further pluralities of parameters is not shown in the main screen SM.

With reference to FIGS. 3 to 6, the control unit 15 is configured to display one or more of the following further pluralities of screens: a first further screen portion QP1 depicting a schematised symbol of the winch, a second further screen portion QP2 depicting a schematised symbol of the tracked vehicle, preferably a snow groomer; a third further screen portion QP3 depicting a schematised symbol of the shovel, a fourth further screen portion QP4 depicting a schematised symbol of the cab; a fifth further screen portion QP5 depicting a schematised symbol of a shaft of the tiller; a sixth further screen portion QP6 depicting a schematised symbol of the tiller; a seventh further screen portion QP7 depicting a symbol of the lights; an eighth further screen portion QP8 depicting a symbol of a fan and of the temperature degrees; a ninth further screen portion QP9 depicting a symbol of a radio tuning and the name of a radio station; a tenth further screen portion QP10 depicting a generic symbol preferably, but not limited to, parallel lines; an eleventh further screen portion QP11 schematically depicting the symbol of a man and the name of an operator; a twelfth screen portion QP12 schematically depicting a clock and the date; a thirteenth further screen portion QP13 depicting the outside temperature and symbols indicating the data communication signal reception values.

The control unit 15 is configured to display on the display 30 the secondary screen associated with the respective further screen portion QP1-QP13 when it detects the touch of an operator U in an area occupied by one of the further screen portions QP1-QP13.

For example, FIG. 7 depicts the secondary screen associated with the seventh further screen portion QP7. In use, when the operator U touches the display 30 in the area occupied by the seventh further screen portion QP7, the control unit 15 detects the touch of the operator U, preferably through the detection device 31, and displays the secondary screen associated with the seventh further screen portion QP7, which is shown by way of example in FIG. 7 and relates to a configuration profile for the lights that illuminate the external environment.

In greater detail, the secondary screens accessible through the further screen portions QP1-QP13 illustrate parameters of the tracked vehicle 1 and allow the setting of parameters of the tracked vehicle 1, wherein at least some of said parameters of the secondary screens are not shown or cannot be set in the main screen SM.

In greater detail, the first further screen portion QP1 depicting a schematised symbol of the winch 10 is associated with a secondary screen illustrating an additional plurality of parameters of the winch 10, both for configuration and for detection, wherein at least some of said parameters are not shown or cannot be configured in the main screen SM.

The second further screen portion QP2, depicting a schematised symbol of the tracked vehicle 1, preferably a snow groomer, is associated with one or more secondary screens, wherein a first secondary screen illustrates parameters relating to the tensioning of the tracks 6 and wherein this first secondary screen allows the setting of parameters relating to the tensioning, in greater detail the tracked vehicle 1 comprises a tensioning device which is configured to adjust the tensioning of the tracks 6, said tensioning device is coupled to the control unit 15 and is adjustable through said first secondary screen; a second secondary screen illustrates parameters relating to the sensitivity of the driving commands, for example the sensitivity of a driving pedal of the tracked vehicle, of control levers coupled to the tracks of the tracked vehicle, of an autobrake system, and of the control of the suspensions, and allows the setting of said parameters; a third secondary screen illustrates parameters of the drive unit 5, for example, the number of engine revolutions, the operating mode of an air filter of the drive unit, and allows the setting of said parameters.

The third further screen portion QP3 depicting a schematised symbol of the shovel 8 is associated with a secondary screen illustrating an additional plurality of parameters of the shovel 8, both for configuration and for detection, wherein at least some of said parameters are not shown or cannot be configured in the main screen SM.

The fourth further screen portion QP4, depicting a tracked vehicle, is associated with a secondary screen illustrating an additional plurality of parameters of the cab, both for configuration and for detection, wherein at least some of said parameters are not shown or cannot be configured in the main screen SM.

The fifth further screen portion QP5 depicting a schematised symbol of the tiller 9 is associated with a secondary screen illustrating an additional plurality of parameters of the tiller 9, both for configuration and for detection, wherein at least some of said parameters are not shown or cannot be configured in the main screen SM.

The sixth further screen portion QP6 depicting a schematised symbol of the tiller 9 is associated with a secondary screen illustrating an additional plurality of parameters relating to functions associated with the creation of snow parks, in particular for the setting of some or all of the parameters displayed in the fourth main screen portion PS4 and for the setting of other parameters relating to the functions of the snow park and not illustrated in the fourth main screen portion PS4.

The eighth further screen portion QP8 depicting the symbol of a fan and of the temperature degrees is associated with a secondary screen illustrating an additional plurality of parameters of the fan and/or temperature, both for configuration and for detection, wherein at least some of said parameters are not shown or cannot be configured in the main screen SM.

The ninth further screen portion QP9 depicting a symbol of a radio tuning and the name of a radio station is associated with a secondary screen illustrating an additional plurality of parameters of the radio station, both for configuration and for detection, wherein at least some of said parameters are not shown or cannot be configured in the main screen SM.

The tenth further screen portion QP10 depicting a generic symbol, preferably, but not limited to, parallel lines, is associated with a secondary screen which, in turn, depicts a plurality of further secondary screens which can be selected by touching the display, and wherein at least some of these cannot be directly selected from the main screen.

The eleventh further screen portion QP11 schematically depicting the symbol of a man and the name of an operator U is associated with a secondary screen in which an operator code can be entered to call up configurations of the main screen SM and/or of the secondary screens associated with said operator profile.

The twelfth screen portion QP12 schematically depicting a clock and the date is associated with a secondary screen in which the time and date can be set.

The thirteenth further screen portion QP13 depicting the outside temperature and symbols indicating the data communication signal reception values is associated with a secondary screen comprising more data relating to the outside temperature and the data communication reception.

In an alternative embodiment of the present invention, the display 30 is not of the touch screen type and the detection device 31 is omitted and replaced by a selector, which can be a knob or a wheel or a joystick or a set of the above devices to detect selections made by an operator.

In a preferred embodiment provided as an example, without thereby losing generality, the control unit 15 is divided into a main control unit exclusively dedicated to the control of the tracked vehicle 1 and of the accessory devices, and a secondary control unit dedicated to the control of the display 30 and associated with the main control unit for sending and receiving data.

The invention claimed is:

1. A tracked snow groomer vehicle, for preparation of ski runs, comprising:
   a plurality of tracks;
   at least one accessory device selected in a group comprising a shovel or blade, a tiller assembly and a winch assembly; and
   a user interface comprising a display and a selector device for receiving commands from an operator, the selector device includes a touch screen detection device that detects a touch of an operator on the display;
   a control unit coupled to the user interface, in particular to the display, for sending images to be displayed to the display and receiving commands from the display which are related to the touches detected;
   wherein the control unit is configured to display on the display:
   a main screen divided into a plurality of main screen portions and a plurality of further screen portions, wherein the plurality of main screen portions are displayed together in the main screen and each in a different position in the main screen; wherein each main screen portion is configured to display an image that illustrates one or more pieces of data correlated to the tracked snow groomer vehicle;
   a secondary screen, associated with one of the plurality of main screen portions, wherein the secondary screen illustrates configuration parameters and wherein the operator sets the configuration parameters for one of: a drive unit, the plurality of tracks, and the at least one accessory device; and
   the control unit is further configured to:
   detect one or more selections made by an operator, on the display by means of a touch, corresponding to data that are to be displayed in at least one of the main screen portions and corresponding to the configuration parameters displayed in the secondary screen of the display;
   display an image, corresponding to the detection of one or more selections, on the at least one of the main screen portions of the display;
   couple the plurality of further screen portions to corresponding secondary screens;
   switch temporarily the main screen to a corresponding secondary screen based on the detection of one or more selections on the display in one of the plurality of further screen portions of the main screen;
   adjust a tensioning of tracks, sensitivity of a driving pedal and control levers using one or more of the secondary screens and based on the detection of the one or more selections made by the operator via the touch screen detection device;
   determine a relative angular position of the tiller assembly with respect to the frame of the vehicle using a control system, thereby defining a cutting angle of the tiller assembly;
   display on one or more of the secondary screens a position of the tiller assembly and the cutting angle of the tiller assembly; and
   based on the displayed cutting angle, the operator rotates the tiller assembly to adjust the cutting angle;
   defining a pulling force of a winch rope using a drum and defining a position of an arm of a winch using an actuator;
   display values relating to the winch;
   based on the display of the values related to the winch, the operator controls the pulling force of the winch rope and the angular position of the arm.

2. The tracked snow groomer vehicle of claim 1, wherein the control unit is configured to display in a first main screen portion of the plurality of main screen portions a first depiction of the tracked snow groomer vehicle, the first depiction being schematic; and wherein the first depiction of the tracked snow groomer vehicle comprises a representation of the accessory devices that are currently connected to the tracked snow groomer vehicle, one or more among the shovel, the tiller, track setting devices, and the winch; and wherein said representation of the accessory devices comprises a representation of a current position of one or more of the accessories, in particular a raised or lowered position of the tiller and the position of the arm of the winch, including a front or rear position.

3. The tracked snow groomer vehicle of claim 2, wherein the control unit is configured to display in a second main screen portion of the plurality of main screen portions a second depiction of the tracked snow groomer vehicle, the second depiction being schematic; wherein the first depiction is a top view of the tracked snow groomer vehicle and the second depiction is a side view of the tracked snow groomer vehicle; wherein the tiller of the tracked snow groomer vehicle comprises two side wings configured to vary their position with respect to the tiller, wherein the second representation of the tracked snow groomer vehicle comprises a representation of the position of the side wings of the tiller; wherein the shovel of the tracked snow groomer vehicle comprises a central blade and the two side blades coupled to the central blade and configured to vary their position with respect to the central blade, wherein the second representation of the tracked snow groomer vehicle comprises a representation of the position of the side blades.

4. The tracked snow groomer vehicle of claim 1, wherein the control unit is configured to display in a third main screen portion of the plurality of main screen portions data relating to drive speed of the tracked snow groomer vehicle and data relating to engine revolutions of the tracked snow groomer vehicle.

5. The tracked snow groomer vehicle of claim 1, wherein the control unit is configured to display in a fourth main screen portion of the plurality of main screen portions data relating to tilt of the tracked snow groomer vehicle according to a roll axis and data relating to tilt of the tracked snow groomer vehicle according to a pitch axis.

6. The tracked snow groomer vehicle of claim 1, comprising a tracking device coupled to the control unit to send a position of the tracked snow groomer vehicle, wherein the control unit is configured to display in a fifth main screen portion of the plurality of main screen portions a navigation map of the tracked snow groomer vehicle, the navigation map of the tracked snow groomer vehicle highlights a path already travelled by the tracked snow groomer vehicle.

7. The tracked snow groomer vehicle of claim 1, wherein the tracked snow groomer vehicle comprises at least one video camera facing the rear of the tracked snow groomer vehicle, and framing a portion of ground on which the tracked snow groomer vehicle has passed; the control unit is configured to display in a sixth main screen portion of the plurality of main screen portions images captured by the video camera.

8. The tracked vehicle of claim 1, wherein the tracked snow groomer vehicle comprises at least one video camera facing a rear of the tracked snow groomer vehicle, and framing a portion of ground on which the tracked snow groomer vehicle has passed; the control unit is configured to display on the display a further display mode wherein a first, a second, a fifth and a sixth main screen portion display an image captured by the video camera and a miniature portion of a navigation map of the tracked snow groomer vehicle, the navigation map of the tracked snow groomer vehicle highlights a path already travelled by the tracked snow groomer vehicle; the tracked snow groomer vehicle comprises a tracking device coupled to the control unit to send a position of the tracked snow groomer vehicle.

9. The tracked vehicle of claim 1, wherein the tracked snow groomer vehicle comprises a tracking device coupled to the control unit to send a position of the tracked snow groomer vehicle; the control unit is configured to work in a further display mode wherein a first, second, fifth and sixth portion of the screen show a navigation map of the tracked snow groomer vehicle, the navigation map of the tracked snow groomer vehicle highlights a path already travelled by the tracked snow groomer vehicle and show, from a small portion of an image captured by a video camera, a rear portion of the tracked snow groomer vehicle, in particular a portion of snow already worked; wherein the tracked snow groomer vehicle comprises at least one video camera facing the rear of the tracked snow groomer vehicle, and framing a portion of ground on which the tracked snow groomer vehicle has passed.

10. The tracked snow groomer vehicle according to claim 1, wherein the control unit is configured to illustrate in a fifth portion of the screen a thermostat to show and set temperature inside the cab of the tracked snow groomer vehicle or the control unit is configured to illustrate in a sixth portion of the screen a frequency tuning for stations of a car radio.

11. The tracked snow groomer vehicle according to claim 1, wherein the control unit is configured to illustrate in a seventh portion of the main screen values relating to the winch, including one or more of: length of cable unwound, pulling force in absolute value or as a percentage of total possible pulling force; wherein, in an alternative display mode, the values of the winch can be shown in transparency and superimposed on other data, such as on a portion of a map or a portion of an image of a rear video camera of the tracked snow groomer vehicle.

12. The tracked snow groomer vehicle according to claim 1, wherein the control unit is configured to illustrate in an eighth portion of the main screen a representation of a tiller, and of any track-setting devices connected thereto, and to illustrate next to a representation of the tiller values relating to the tiller, including one or more of the following values: shaft rotation speed, shaft rotation direction, tilt angle of the tiller with respect to a snow cover, percentage of recirculation of the snow inside the tiller.

13. The tracked snow groomer vehicle according to claim 1, wherein the control unit is configured to store a plurality of operator profiles associated with different main screen configurations, in particular with different main screen portions to be displayed, and is configured to call up and display on the display one of the stored main screen configurations when receiving the operator code associated with one of the stored configurations; wherein the operator code is input by means of the selector device.

14. The tracked snow groomer vehicle according to claim 2, wherein the control unit is configured to work in an alternative display mode wherein one or more images are extended to two or more main screen portions, and one or more other images are displayed in transparency over the one or more images that are extended to two or more of the main screen portions.

15. The tracked snow groomer vehicle according to claim 1, wherein the control unit is configured to display on the display on the main screen a further plurality of screen portions, arranged along an outer edge of the main screen; and wherein the control unit is configured to couple each of the further plurality of screen portions to a respective plurality of secondary screens; the plurality of secondary screens illustrating further pluralities of parameters of the tracked snow groomer vehicle, wherein at least a part of the further pluralities of parameters is not shown in the main screen; and wherein the control unit is configured to display one or more further pluralities of screens: a first further screen portion (QP1) depicting a schematised symbol of the winch, a second further screen portion (QP2) depicting a schematised symbol of the tracked snow groomer vehicle, a third further screen portion (QP3) depicting a schematised symbol of the shovel, a fourth further screen portion (QP4) depicting a schematised symbol of a cab; a fifth further screen portion (QP5) depicting a schematised symbol of a shaft of the tiller; a sixth further screen portion (QP6) depicting a schematised symbol of the tiller; a seventh further screen portion (QP7) depicting a symbol of lights; an eighth further screen portion (QP8) depicting a symbol of a fan and of a temperature; a ninth further screen portion (QP9) depicting a symbol of a radio tuning and a name of a radio station; a tenth further screen portion (QP10) depicting a generic symbol; an eleventh further screen portion (QP11) schematically depicting a symbol of a man and a name of an operator; a twelfth screen portion (QP12) schematically depicting a clock and a date; a thirteenth further screen portion (QP13) depicting an outside temperature and symbols indicating data communication signal reception values; and wherein the control unit is configured to display on the display the respective secondary screen associated with the respective further screen portion when it detects the selection made by an operator in an area occupied by one of the further screen portions.

16. A method for displaying information and setting commands in a tracked snow groomer vehicle, by means of a touch screen display in the tracked snow groomer vehicle; the tracked snow groomer vehicle, consisting of a snow groomer for the preparation of ski runs, comprising:
    a plurality of tracks;
    at least one accessory device selected in a group comprising a shovel or blade, a tiller assembly and a winch assembly, and
    the display;
the method comprising the steps of:
    displaying on the display a main screen divided into a plurality of main screen portions and a plurality of further screen portions, wherein the plurality of main screen portions are displayed together in the main screen and each in a different position in the main screen; wherein each main screen portion is configured to display an image that illustrates one or more pieces of information correlated to the tracked vehicle;
    detecting one or more selections made by an operator, on the display by means of a touch screen detection device, corresponding to data that are to be displayed in at least one of the main screen portions of the display,
    displaying an image, corresponding to the detection of one or more selections made by an operator, on the at least one of the main screen portions of the display;
    coupling each of the plurality of further screen portions to its corresponding plurality of secondary screen portions;

switching temporarily the main screen to one of the secondary screens based on the detection of one or more selections on the display made by an operator in one of the plurality of further screen portions of the main screen, wherein the secondary screen is associated with the detected main screen portion and wherein the secondary screen illustrates parameters of the tracked vehicle;

controlling the operation of the at least one accessory device based on the detection of the one or more selections made by the operator via the touch screen detection device; and connecting to a remote fleet management system using the control unit to send and receive data on positions of tracked vehicles; and displaying on a navigation map a path already travelled by the tracked vehicle over one of the ski runs and displaying other tracked vehicles present in an area.

17. The tracked snow groomer vehicle of claim 1 further comprising a tensioning device for adjusting the tensioning of one or more of the plurality of tracks wherein the tensioning device is operably coupled to the control unit and is adjustable by the operator by means of touch through a secondary screen illustrating parameters relating to tensioning of the tracks wherein the operator adjusts the tensioning of one or more of the plurality of tracks.

18. The tracked snow groomer vehicle of claim 1 further comprising a control device coupled to one or more of the tracks wherein a secondary screen illustrates parameters relating to sensitivity of the control device, that controls the movement of the tracked snow groomer vehicle and wherein operator setting of the sensitivity parameters is selected by touching the display.

19. The tracked snow groomer vehicle of claim 1 wherein the secondary screen illustrates parameters of the drive unit including number of engine revolutions and allows the setting of said number of engine revolutions.

20. The tracked snow groomer vehicle of claim 1 further comprising a suspension system and wherein the secondary screen illustrates parameters relating to control of suspension in the suspension system and wherein the operator sets parameters for control of the suspension by touching the display.

* * * * *